Inventor
William Barry Hall

Aug. 13, 1968  W. B. HALL  3,396,879
PNEUMATIC CONVEYORS
Filed Aug. 3, 1965  2 Sheets-Sheet 2

Inventor
*William Barry Hall*
By
*Mason, Porter, Diller & Brown*
Attorneys

United States Patent Office 3,396,879
Patented Aug. 13, 1968

---

3,396,879
PNEUMATIC CONVEYORS
William Barry Hall, Hermitage Lane,
Mansfield, Nottinghamshire, England
Filed Aug. 3, 1965, Ser. No. 476,883
17 Claims. (Cl. 223—43)

ABSTRACT OF THE DISCLOSURE

Disclosed herein is a pneumatic conveyor for transporting articles from an inspection station to a work station and subsequently to a collection station including a delivery tube into which the articles are to be inserted at the inspection station. The delivery tube is connected via a plurality of valves to a plurality of branch tubes, which terminate at a work station. Control means are provided at the inspection station for controlling the operation of the valves to direct an article to a particular one of the work stations. A further pipe opens at each of the work stations for delivering the articles from any of the work stations to a collecting point.

---

This invention relates to improvements in pneumatic conveyors for transporting articles from a point where the articles are fed into the conveyor and carried therefrom to any selected one of a plurality of delivery points or stations for the purpose of further operations to be carried out on the articles or for sorting the articles so that all articles of the same size or type are delivered to the same station or articles requiring further operations to be carried out thereon are distributed to a selected station for an operator stationed there. The conveyor is, for example, particularly suitable for transporting articles such as stockings, socks, or the like from a feeding point to any selected one of a plurality of delivery stations for further operations or for sorting the articles according to size.

For example in the manufacture of hose on circular knitting machines, the hose are pressed off the machines with an opening across the toe of the stocking and this is subsequently seamed up to complete the stocking. Before this operation is carried out the stocking is examined and if perfect is turned inside out for the toe seaming operation. The stockings are transported from the circular knitting machines to an examining table where they are placed on a form and if perfect are sent to the operators of the seaming machines after being turned inside out. The object of the present invention is to provide a transporting system which will in one application, transport the stockings from the examining point to any selected one of a plurality of delivery points for seaming machine operators. After the seaming operation has been carried out, the stockings are transported to a delivery point and turned right side out in the process.

According to this invention an article for transport is fed into a delivery tube connected with a plurality of branch pipes, each branch pipe leading to a flap controlled outlet at a delivery point and each branch pipe near its outlet is connected by a tube to the suction side of an air pump by a valve, each branch pipe having a selecting valve therein which is opened to connect its branch pipe to the delivery tube by the closure of a switch and the passage of an article past a photo-electric cell in the branch pipe moves the valve to apply pressure to the delivery tube and consequently to the selected branch pipe. In the transport of stockings or the like, the stockings are placed on an examining form having an internal passage therein and the passage in the form is connected to the delivery tube. When the examining form is mounted on a table the passage in the form is also connected to a flap controlled outlet over the table so that any faulty stockings can be delivered on to the table. Each delivery point may have a pneumatic conveyor system leading therefrom to a collecting point and has means associated therewith to turn a stocking right side out before reaching the collecting point.

The invention will now be more particularly described as applied to a hose transporting system and with reference to the accompanying drawings in which.

Like numerals indicate like parts throughout the drawings.

Figure 3:
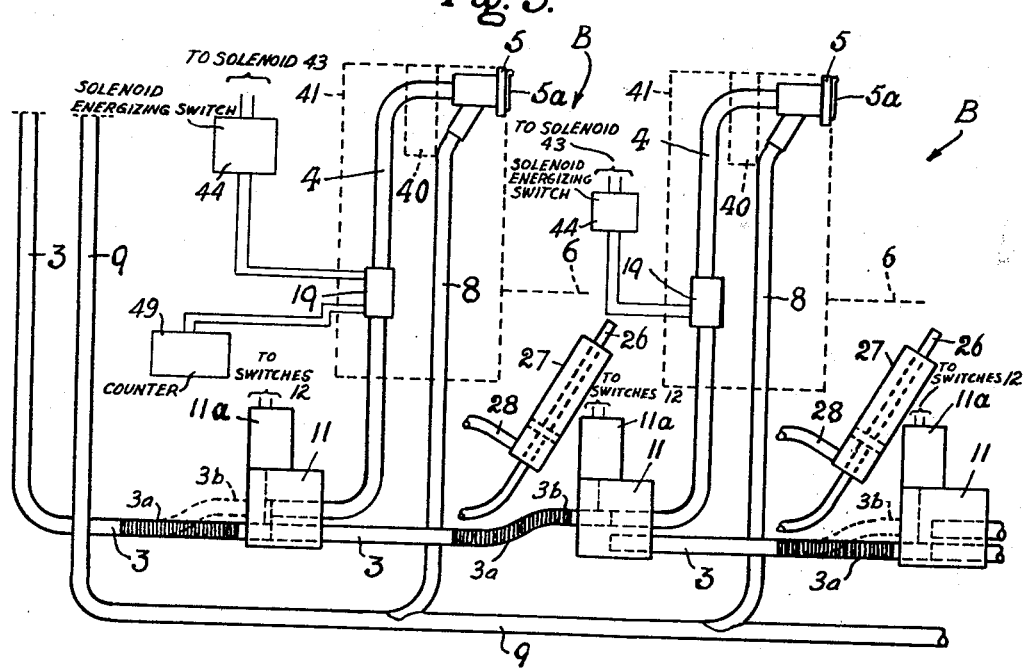

In carrying out this invention the hose examining form 1 is mounted on a table 2 located at an examining point or examining area generally referred to by the reference A and a passage 1a down the inside of the form 1 is connected by a delivery tube 3 to a number of branch pipes 4 (see FIG. 3) according to the number of delivery points or delivery areas B to be supplied. Each branch pipe 4 leads to an outlet 5 over a table 6, and each outlet 5 is provided with a flap valve 5a which prevents air from entering the outlet 5.

Each branch pipe 4 is connected near to its outlet to the suction side of an air pump 7 by pipes 8 hereinafter referred to as suction pipes which are connected by a pipe 9 to a valve 10 associated with the air pump 7. Each branch pipe 4 has a valve 11 therein which normally maintains the pipes 4 out of communication with the tubes 3. Valve 11 is moved by energising a solenoid 11a associated therewith to connect its branch pipe 4 to the delivery tube 3 by closing the appropriate push button switch of the group 12 conveniently arranged on the examining form table 2. The valves 11 may be arranged such that energisation of one of the solenoids 11a draws the arm upwardly bending the flexible portion 3a of the tube 3 into the position shown at 3b to communicate with an associated branch pipe 4.

Figure 2:
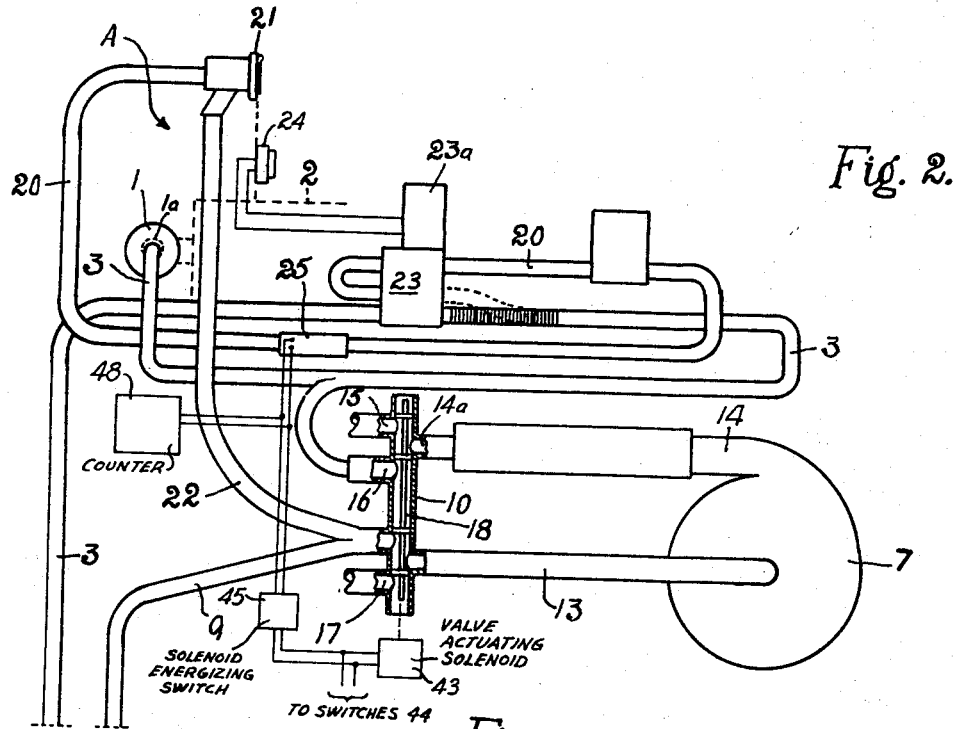
FIG. 2 shows diagrammatically the pneumatic system for transporting hose from the examining form for delivery to the toe seaming machines and turning it inside out in the process.

The valve 10 has two operative positions. In its normal position in which it is shown in FIG. 2, the pipe 9 is connected to the suction pipe 13 of the air pump 7 and the pressure side 14 is connected to the atmosphere through the port 15 of the valve 10. In its other operative position the pressure side 14 of the air pump 7 is connected to the delivery tube 3 through the port 16 of the valve 10 and the suction side 13 is connected to the atmosphere through the port 17 of the valve 10. The valve 10 is moved from its normal position shown in FIG. 2 to its other position by energising a solenoid 43 which is connected to the valve spindle 18 to move the spindle downwardly. Thus when the valve 10 is changed over air is blown into the delivery tube 3 via the air pump output passage 14, valve port 14a and valve port 16 thus reversing the method of producing the air flow through the delivery pipe 3 and selected branch pipe 4 originally resulting from the movement of the valve 11.

In order to energise the solenoid associated with the valve 10 the following arrangement is adopted. Disposed in each branch pipe 4 is a photo-electric cell 19 and when a stocking passes a photo-electric cell as it is drawn by suction along a branch pipe 4 it effects the energising of the circuit of the solenoid 43 of the valve 10 through a relay switch or relay 44 and changes the valve 10 so that suction in the suction pipes 8 is cut off and air pressure forced down the delivery tube 3 and the stocking is blown out of the outlet of the selected branch pipe 4.

The arrangement works in the following manner. When a stocking has been placed on the form 1 and found to be perfect, one of the push button switches in the group 12 is pressed and suction is applied to the passage down the inside of the form through the delivery tube 3 and selected branch pipe 4 and associated pipe 8 and 9. The stocking is drawn down the inside of the form 1 and into the branch pipe 4 selected by the pressing of the appropriated push button in the group 12 to energize the solenoid 11a and effect consequent movement of the valve 11 to connect the delivery tube 3 with the selected branch pipe 4. When the stocking passes the photo-electric cell 19 in the selected branch pipe 4 the valve 10 is moved and air blown into the delivery tube 3 through the valve port 16 and the stocking blown through the outlet 5 onto the table 6 associated therewith. The passage of the stocking down the inside of the form 1 is effected through the sliding of the end thereof closest the opening of the passage 1a off of the form 1 and into the passage. The continued drawing of the stocking off of the form 1 and into the passage 1a turns it inside out ready for, say for example, a seaming machine operator and by pressing the appropriate push button it is delivered to the required operator. The passage in the form 1 may also be connected by a pipe 20 to an outlet 21 over the examining form table 2, the pipe being opened to suction from the pipe 22 by a control valve 23 opened as by energisation of the valve solenoid 23a in a similar manner to that described in connection with the valves 11 by a push button switch 24 so that faulty stockings can be delivered onto the table 2.

When the switch 24 is closed the valve 23 is operated and the suction in the pipe 22 draws a stocking released from the form 1 along the pipe 20 towards the outlet 21. Disposed in the pipe 20 is a photo-electric cell 25 and when the stocking passes the photo-electric cell 25 it operates a switch or relay 45 to energise the solenoid 43 which operates the valve 10 and the latter is operated to cut-off the suction on the pipe 22 and blow air through the valve port 16 into the tube 20 and the stocking is blown through the outlet 21 onto the table 2.

After the stockings have been seamed they are transported by a pneumatic conveyor to a collecting point or collection area. The stockings are still inside out and in order to turn them so that they have the right side out when arriving at the collecting point they may be placed on a member having a passage therethrough which is connected with a conveyor tube. The stocking is drawn through the member into the conveyor tube by suction and is turned in the process and is carried along the conveyor tube by a stream of air induced therein.

In order to obviate the necessity of placing stockings on the member, provision may be made for automatically turning the stockings after the seaming operation. For this purpose the open end of the stocking is dropped over the tube 26 and into the surrounding receptacle 27 connected to an outlet pipe 28 through which air is drawn. When the toe of the stocking has been seamed, the stocking is released, the suction cut-off from the receptacle 27 and applied to the tube 26. The stocking is drawn down the inside of the tube 26 being turned in the process, and into the delivery pipe 29 and along the latter to the delivery outlet 30 being blown out through the outlet 30 onto the delivery table 31 as will be herein explained.

Figure 1:
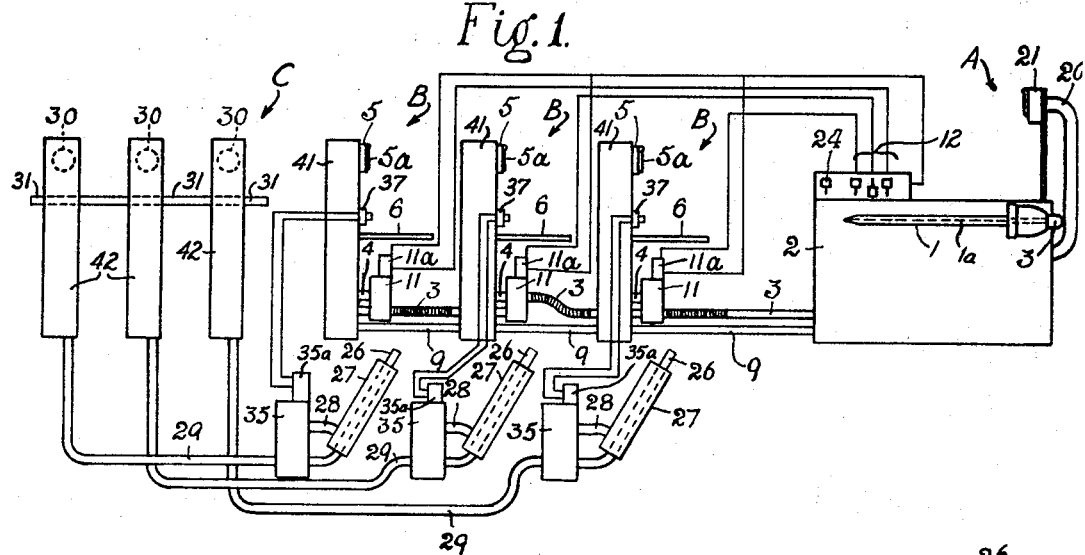
FIG. 1 shows diagrammatically the pneumatic hose transporting system according to this invention.
Figure 4:
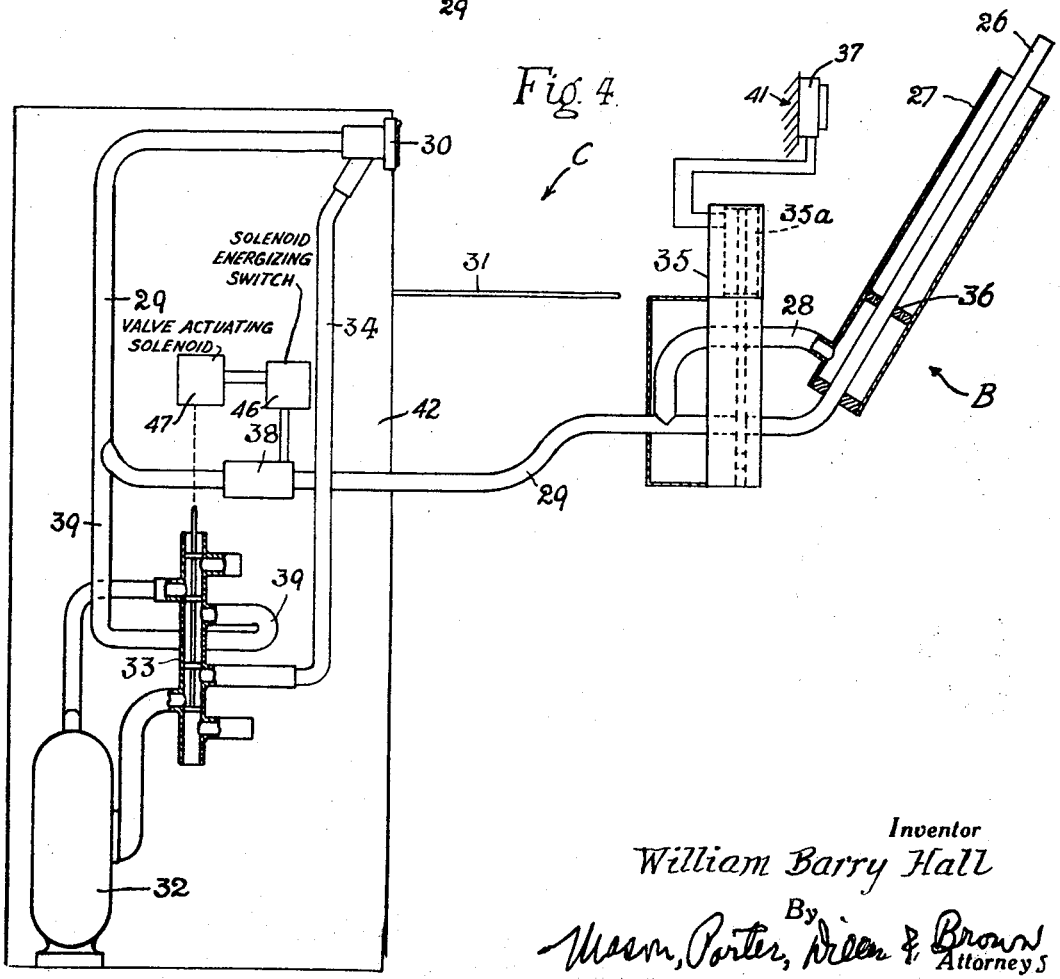
FIG. 3 shows diagrammatically the pneumatic system for transporting the hose from the examining form to a selected toe seaming machine and FIG. 4 shows diagrammatically the pneumatic system for transporting the hose from the toe seaming machines to a collecting point and turning the hose right side out in the process.

Associated with each turning and delivering system is an air pump 32 (see FIG. 4) and the inlet side of this pump is normally connected through a valve 33 to a collecting point or collecting area C near the delivery outlet 30 by a pipe 34 so that suction is applied to the delivery pipe 29. The pipe 26 and pipe 28 are connected to the delivery pipe 29 through a change over valve 35. Normally the valve 35 is in the position in which the pipe 28 is connected to the delivery pipe 29 and the pipe 26 closed so that normally suction is applied to the receptacle 27. The latter is provided with a perforated collar 36 therein to prevent a stocking placed on the tube 26 from being drawn into the pipe 28. The operator places a stocking on the tube 26, retaining hold of the toe end for seaming and after the toe has been seamed, releases the toe and the stocking is drawn down the outside of the tube 26 by the suction in the receptacle 27. The operator then closes the switch 37 which energises a solenoid 35a to change over the valve 35 so that the suction is now applied to the pipe 26 and the stocking is drawn down the pipe 26 and through the pipe 29 towards the delivery opening 30. Disposed in the pipe 29 is a photo-electric cell 38 and the passage of the stocking past this cell is arranged to energise a solenoid to adjust the valve 33, which is similar in operation to the previously described valve 10, so that air is now blown into the tube 29 through the tube 39 and the stocking blown out of the outlet 30 onto the delivery table 31 at collecting point C.

The switches 44, 45 operated by the photo-electric cells 19 and 25 are arranged so that they only remain closed for a short time and the solenoids associated with the valves 10 and 33 are only energised for a short time, sufficient to blow a stocking out of the outlet to which it is directed and the valves 10 and 33 then return to their normal positions.

The push button switches in the group 12 and switch 24 are arranged so that when operated they remain in their operative positions but return any other switch to its "off" position so that when a selection is made, the selection remains operative until another selection is made. Consequently when a particular valve 11 is selected and its branch pipe 4 is connected to the conveyor tube 3, the connection remains until another selection is made. When a selected valve 11 is subjected to suction through its associated suction pipe 8 and consequently when a fresh selection is made the previously selected valve may be kept open by the suction. To prevent this happening cut-off valves 40 indicated by broken lines in FIG. 3 may be inserted in the branch pipes 4. These cut-off valves are normally closed but are opened by a solenoid which is energised when a selection is made by closing the required push button switch and remains energised until a fresh selection is made which returns the previously selected switch to its "off" position, allowing the cut-off valve to close and also the previously operative valve 11.

The photo-electric cells may be arranged to operate counters 48, 49 each time a stocking passes them so that a record of the production is obtained from each operator. The counters 48, 49 may, of course, be any of a number of commercially available counters.

In summary, an operator at the examining station A places a stocking over the form 1, examines such stocking and if the stocking is found to be perfect inserts the end of the stocking closest the opening of the passage 1a into such opening and actuates an appropriate switch 12 to select a delivery area B. The stocking is drawn into the passage 1a by the vacuum applied thereto via the air pump 7, the suction pipe 8 associated with the selected branch pipe 4, the actuated valve 11, the delivery tube 3 and the passage 1a. The stocking is drawn through the passage 1a, the delivery tube 3, the actuated valve 11, and the branch pipe 4 until such stocking passes the photo-electric cell 19 in the selected branch pipe 4. Passage of the stocking past the photo cell 19 actuates one of the solenoid energizing switches 44 to energize the solenoid 43 moving the spindle 18 downwardly within the valve 10. Movement of the spindle 18 downwardly within the valve 10 places the output side 14 of the air pump 7 in the communication with the delivery tube 3 via the valve port 14a, and the output valve port 16 which is in communication with the tube 3. The stocking is then blown out of the opening 5 into the selected work station B.

A further operator at the work station or delivery point B places the stocking over the air passage 26 and the suction applied to the receptacle 27 via the valve 35 draws the greater portion of the stocking into the receptacle 27 while the operator seams the toe portion of such stocking. Once the toe portion of the stocking has been seamed, the operator at area B releases the stocking toe portion, actuates the switch 37 to apply the suction in the tube 29 to the pipe 26 whereupon the stocking is drawn toe first into the pipe 26, being inverted as it is drawn therein. The stocking passes through the pipe 26 into the delivery tube 29 and past the photo-electric cell 38. Passage of the stocking past the photo-electric cell 38 operates the solenoid energizing switch 46 to energize the valve actuating solenoid 47 and to drive the spindle of the valve 33 downwardly to place the output portion of the air pump 32 in communication with the delivery pipe 29 via the valve 33 and the tube 39. The stocking, thus, is blown through the remainder of the tube 29 out of the opening 30 onto the table 31 in the collecting area C.

Should the initial operator in the inspection area A determine that a stocking under inspection is defective, the operator inserts the end of such stocking into the passage 1a while actuating the switch 24. The switch 24 energizes the solenoid 23a to open the valve 23 in a manner similar to the actuation of the valves 11 and the rejected stocking is delivered out of the opening 21 in the inspection area A in a manner similar to the operation previously described with respect to the passage of the stocking from the area A to the work station or delivery point B.

With a hose transporting system such as hereinbefore described the hose is automatically turned inside out for toe seaming, delivered to a selected toe seaming operator and delivered therefrom to a delivery point and automatically turned right side out with the minimum amount of handling and consequent saving of time.

The pneumatic transporting system described can also be used with a plurality of hose examining forms, provision being made to connect the hose examining forms in succession to the delivery tube and the system used for sorting stockings by transporting stockings of the same size to the same delivery point.

What we claim is:

1. A pneumatic conveyor for transporting articles to any selected one of a plurality of delivery points comprising an air pump, a delivery tube for receiving the articles, a plurality of branch pipes connected to said delivery tube, each of said branch pipes having an outlet at one of the delivery points, a plurality of suction tubes connected to said branch pipes near the outlets thereof, each of said suction tubes having first selectively actuable valve means connected thereto for selectively placing one of said suction tubes and branch pipes in communication with the suction side of said air pump, said branch pipes each having connected thereto second selectively actuable valve means for placing an associated one of said branch pipes in communication with the delivery tube, each of said branch pipes having article sensing means responsive to the passage of an article therepast for actuating said first selectively actuable valve means to place an associated one of said branch pipes in communication with the pressure side of said air pump.

2. A conveyor according to claim 1 wherein said first selectively actuable valve means includes electrically operable means, said article sensing means comprising a photo-electric sensor electrically connected to said electrically operable means for actuating said first selectively actuable valve means.

3. A conveyor according to claim 2 wherein said second selectively actuable valve means includes second electrically operable means and manually operable switch means for actuating said second electrically operable means to actuate said second selectively actuable valve means.

4. A conveyor according to claim 3 wherein said branch pipe outlet includes a movable flap normally covering said outlet.

5. A conveyor according to claim 1 further comprising a hose examining form having internal passage connected to said delivery tube.

6. A conveyor according to claim 5 further comprising a first table mounting said hose examining form, and delivery table means adjacent each of said outlets at each of the plurality of delivery points.

7. A conveyor according to claim 6 further comprising pneumatic hose turning and transporting means at each of said delivery points for turning hose articles and transporting the hose articles to a common collection point.

8. A conveyor according to claim 5 wherein each of said second selectively actuable valve means comprises an electrically operable valve selectively connecting the associated branch pipe, with the delivery tube, said conveyor further comprising a plurality of manually operable switch means located adjacent said first table and electrically connected to said electrically operable valve for actuating one of said valves to place one of said branch pipes into communication with said delivery tube.

9. A conveyor according to claim 8 wherein said electrically operable valves comprise valve operating solenoids connected to said manually operable switch means for energization therefrom.

10. A conveyor according to claim 9 further comprising a normally closed cut-off valve in each of said branch pipes intermediate said second valve means and the outlet of said branch pipe for closing said branch pipe when said branch pipe is out of communication with said delivery tube.

11. A conveyor according to claim 6 wherein one of said branch pipe outlets is located adjacent said first table.

12. A conveyor according to claim 7 wherein said pneumatic hose turning and transporting means comprises a casing, a hose accommodating tube extending through said casing and change-over valve means for selectively connecting said casing and said tube to a suction source.

13. The conveyor according to claim 12 wherein said change-over valve includes a change-over valve actuating solenoid and solenoid energizing switch means electrically connected to said solenoid.

14. A conveyor according to claim 12 further comprising a second delivery tube extending to a collecting point and having an outlet at said collecting point, a further suction pipe connected to said delivery tube adjacent the outlet thereof and third selectively actuable valve means for connecting said suction pipe to a vacuum source, said change-over valve interconnecting said second delivery tube and said hose accommodating tube for delivering hose into said second delivery tube.

15. A conveyor according to claim 14 further comprising a photo-electric cell located in said second delivery tube and further electrically operable valve means connected to said delivery tube and electrically connected to said photo-electric cell for connecting said delivery tube to an air pressure source in response to actuation by said photo-electric cell.

16. A conveyor according to claim 15 wherein said further electrically operable valve means includes a valve actuating solenoid and a solenoid energizing switch, said solenoid energizing switch being electrically connected to said second photo-electric cell and to said valve actuating solenoid for energizing said solenoid to actuate said further electrically actuable valve.

17. The conveyor according to claim 1 further comprising counter means electrically connected to said article sensing means for counting the articles in transit past said article sensing means in response to actuation of said article sensing means by the articles.

References Cited

UNITED STATES PATENTS

| 2,890,818 | 6/1959  | Harralson     | 223—43 |
| 2,944,709 | 7/1960  | Kienel        | 223—43 |
| 2,957,613 | 10/1960 | Autem         | 223—43 |
| 3,163,470 | 12/1964 | Brewin et al. | 302—28 |

JORDAN FRANKLIN, *Primary Examiner.*

G. H. KRIZMANICH, *Assistant Examiner.*